United States Patent [19]

Yamaoka et al.

[11] Patent Number: 4,664,210

[45] Date of Patent: May 12, 1987

[54] HYDRAULIC STEERING SYSTEM

[75] Inventors: Kojiro Yamaoka, Nishinomiya; Toshiro Azuma, Minoo; Shigenori Sakikawa, Itami; Jiro Shibata, Amagasaki; Atsushi Odagaki, Sembanishi, all of Japan

[73] Assignee: Kanzaki Kokyukoki Mfg. Co. Ltd., Japan

[21] Appl. No.: 819,860

[22] Filed: Jan. 17, 1986

[30] Foreign Application Priority Data

| Jan. 19, 1985 | [JP] | Japan | 60-8067 |
| Feb. 18, 1985 | [JP] | Japan | 60-22277[U] |
| Feb. 18, 1985 | [JP] | Japan | 60-22278[U] |
| Feb. 18, 1985 | [JP] | Japan | 60-22279[U] |
| Feb. 18, 1985 | [JP] | Japan | 60-31133 |
| Feb. 20, 1985 | [JP] | Japan | 60-23721[U] |
| Feb. 20, 1985 | [JP] | Japan | 60-23722[U] |
| Mar. 13, 1985 | [JP] | Japan | 60-36923[U] |
| Jun. 6, 1985 | [JP] | Japan | 60-86079[U] |

[51] Int. Cl.4 .......................................... B62D 5/08
[52] U.S. Cl. ............................. 180/132; 91/178; 180/141
[58] Field of Search ............... 180/132, 133, 142, 141; 91/178, 189 R, 368

[56] References Cited

U.S. PATENT DOCUMENTS

| 4,043,419 | 8/1977 | Larson et al. |  |
| 4,119,172 | 10/1978 | Yanagishima et al. | 180/142 |
| 4,174,018 | 11/1979 | Liebert et al. | 180/132 |
| 4,213,511 | 7/1980 | Rubenstein et al. |  |
| 4,470,260 | 9/1984 | Miller et al. | 180/132 |
| 4,500,250 | 2/1985 | Maurer et al. | 91/178 |

Primary Examiner—John J. Love
Assistant Examiner—Donn McGiehan
Attorney, Agent, or Firm—Saidman, Sterne, Kessler & Goldstein

[57] ABSTRACT

A hydraulic steering system for use in four-wheel running vehicles or the like of small size and low horsepower. The steering system and a hydraulic system for lifting a working implement are both operable by a single hydraulic pump without the necessity of using a variable displacement hydraulic pump or providing two hydraulic pumps for the two systems. The steering system is operable by an engine of low horsepower.

6 Claims, 10 Drawing Figures

HYDRAULIC STEERING SYSTEM

BACKGROUND OF THE INVENTION

In a four-wheel running vehicle equipped with a working implement which is movable upwardly and downwardly, it is already known to feed a working fluid to the same hydraulic system for lifting the working implement and also to a hydraulic steering system by a single hydraulic pump, as disclosed, for example, in U.S. Pat. Nos. 4,213,511 and 4,043,419.

In the prior art mentioned above, a variable displacement hydraulic pump is used as the hydraulic pump, and the rotation of the steering handle rotatingly operates a hydraulic steering valve and a hand-operated pump to reduce the influence of pressure acting between the hydraulic steering system and the hydraulic lifting system. For stable steering during running, this arrangement requires a large flow rate of working fluid and therefore a pump of large capacity is required. This entails great horsepower consumption for the hydraulic systems and necessitating a drive engine of increased horsepower. The hydraulic systems must also be composed of piping, filter, valve and the like of increased capacity. For this reason, it has been impractical to incorporate a hydraulic steering system into four-wheel running vehicles of small size.

Further with the above arrangement, the hand-operated pump, which is provided for metering, must be rotated for manual steering while the drive engine is stopped.

The present invention is useful also in such a case, permitting manual steering by a simple structure.

SUMMARY OF THE INVENTION

The present invention provides a hydraulic steering system which is operable even by a vehicle drive motor of low horsepower.

For this purpose, the invention eliminates the necessity of employing a variable displacement hydraulic pump, or a hydraulic steering valve or hand-operated pump coupled directly to the steering wheel, or two hydraulic pumps for the hydraulic steering system and for a hydraulic system for lifting a working implement.

According to the present invention, the working fluid discharged from a hydraulic pump is supplied to hydraulic valve means of a hydraulic steering system, and the steering hydraulic valve means is arranged in series with a working implement lifting hydraulic system for the effective use of the working fluid, such that the fluid discharged from the single hydraulic pump is used both for the hydraulic steering system and for the hydraulic lifting system. Thus, the single hydraulic pump, which is of the fixed displacement type and is of relatively small capacity is adapted to feed the working fluid to the two systems, i.e., the hydraulic steering system and the hydraulic lifting system, at the same time. The hydraulic pump can therefore be of such a capacity that it can be driven by an engine of low horsepower.

Further the steering hydraulic valve means of the hydraulic steering system is provided between a pitman arm and knuckle arms and positioned in parallel with a check valve, with the result that although no hand-operated pump is employed, the vehicle can be manually steered while the drive motor is out of operation.

Further according to the invention, the steering hydraulic valve means, which comprises precision parts, and check valve, relief valve, etc., is provided in the form of an assembly at a drag rod portion so that the hydraulic steering system can be easily attached to conventional four-wheel running vehicles without extensive redesign.

Since the present invention employs only one hydraulic pump and no intervening flow divider, the change of the pressure of the working fluid for lifting or lowering the working implement in the hydraulic system therefor directly appears as a pressure change in the steering hydraulic cylinder, with the result that when the steering hydraulic cylinder is of the single piston rod type, the pressure change contracts or extends the cylinder. To eliminate this objection, the steering hydraulic valve means is of the tandem-center type. The spool of the valve means is connectable to the fluid channels with timings chosen so that the fluid channel extending to the hydraulic lifting system does not communicate with the opposite chambers of the steering hydraulic cylinder.

When the steering hydraulic valve means is of the tandem-center type, a slight shock may be delivered to the steering wheel when the valve is opened or closed, and the steering wheel can exhibit increased play during running. Accordingly it is desired that the valve means be of the open-center type; however, in this case pressure change in the lifting hydraulic system results in extension of the steering hydraulic cylinder. To eliminate this objection, a spring biasing the spool of the steering valve means toward its neutral position is arranged to provide a force greater than the force required for rotating the pitman arm from the drag rod side. Thus, when the steering hydraulic cylinder is extended by the pressure change, the movement will not be delivered to the hand of the operator grasping the steering wheel. Thus, the force of the spring is so set that contraction of the spring causes the steering valve means to automatically return the steering hydraulic cylinder to the original position.

With the hydraulic steering system in series with the hydraulic lifting system, the amount of working fluid supplied to the steering system during idling of the drive engine differs greatly from the supply thereto while the engine is run at the higher speeds. This gives a different "feel", to the hand of the operator on the steering wheel. To eliminate this objection, a flow control valve for maintaining the supply of working fluid to the steering system constant at all times is provided in parallel with the steering valve means; a check valve and a relief valve are similarly provided.

When the steering hydraulic system and the lifting hydraulic system are driven by a single hydraulic pump, the pressure of the lifting hydraulic system is delivered directly to the interior of the steering hydraulic cylinder. if the steering hydraulic cylinder is of the single piston rod type, a difference in the magnitude of output between the rod side of the cylinder and the other side thereof occurs. More specifically, as the pressure in the hydraulic cylinder for lifting the working implement increases, the output of the fluid chamber at the rod side of the steering cylinder gradually decreases, whereas the output of the other side gradually increases. This leads to an imbalance in the steering response.

According to the present invention, a limit is set on the lift pressure so that even if the pressure of the rod-side fluid chamber decreases, the output will not be below a minimum required for steering.

DESCRIPTION OF THE PREFERRED EMBODIMENTS

The present invention will be described with reference to the embodiments shown in the accompanying drawings.

Figure 1:
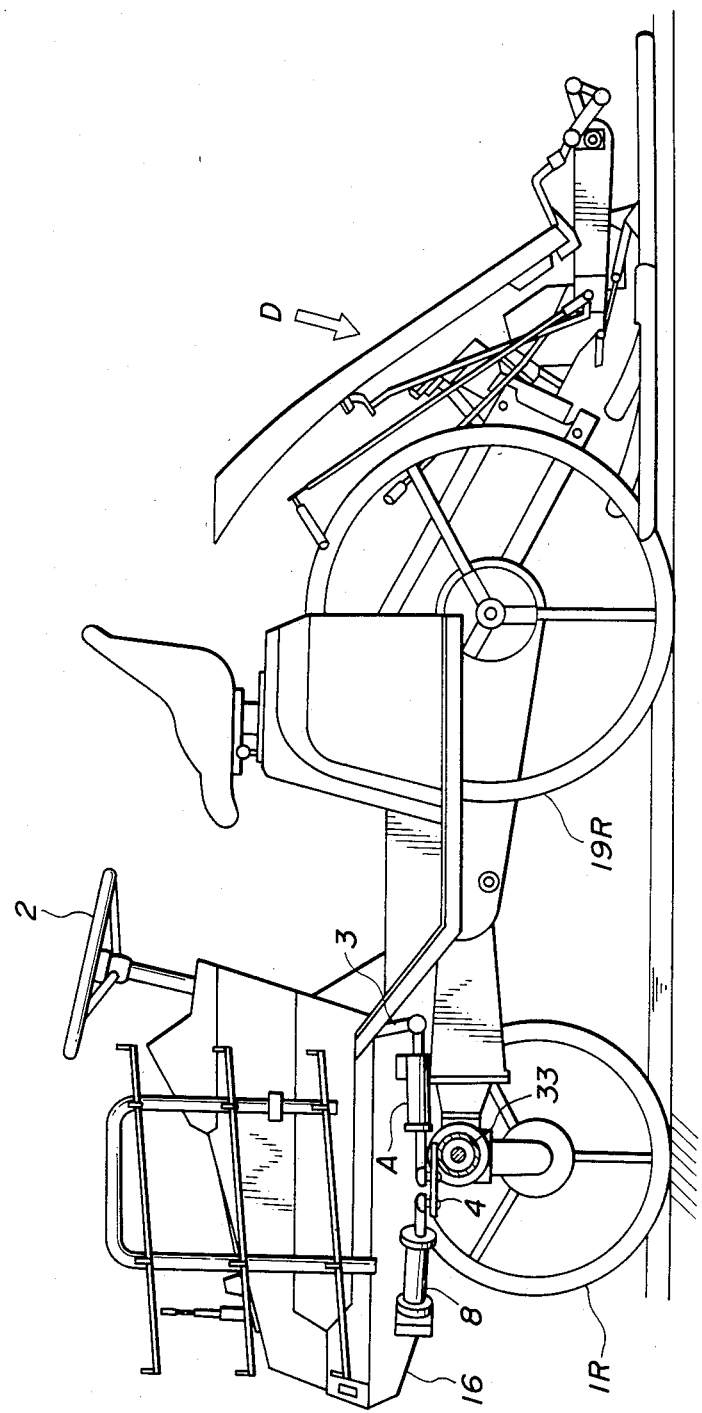
FIG. 1 is an overall side elevation showing a rider-operated rice planting machine equipped with a hydraulic steering system of the present invention.

FIG. 1 shows a rider-operated rice planting machine which has a steering wheel 2 for rotating a pitman arm 3 forward and rearward. Hydraulic valve means A is provided between the pitman arm 3 and a bell crank arm 4 on a front axle 33. A steering hydraulic cylinder 8 for operating knuckle arms is interposed between the other end of the bell crank arm 4 and a machine frame 16.

The hydraulic valve means A is controlled by motion of the steering wheel 2 and is also controlled by the extension or contraction of the cylinder 8 and motion of the bell crank arm 4. Indicated at 1L and 1R are steering front wheels, and at 19L and 19R rear wheels. A planting device D serving as a working implement is upwardly or downwardly moved pivotally by a hydraulic cylinder 25 and hydraulic valve means 26 of a hydraulic system C.

Figure 2:
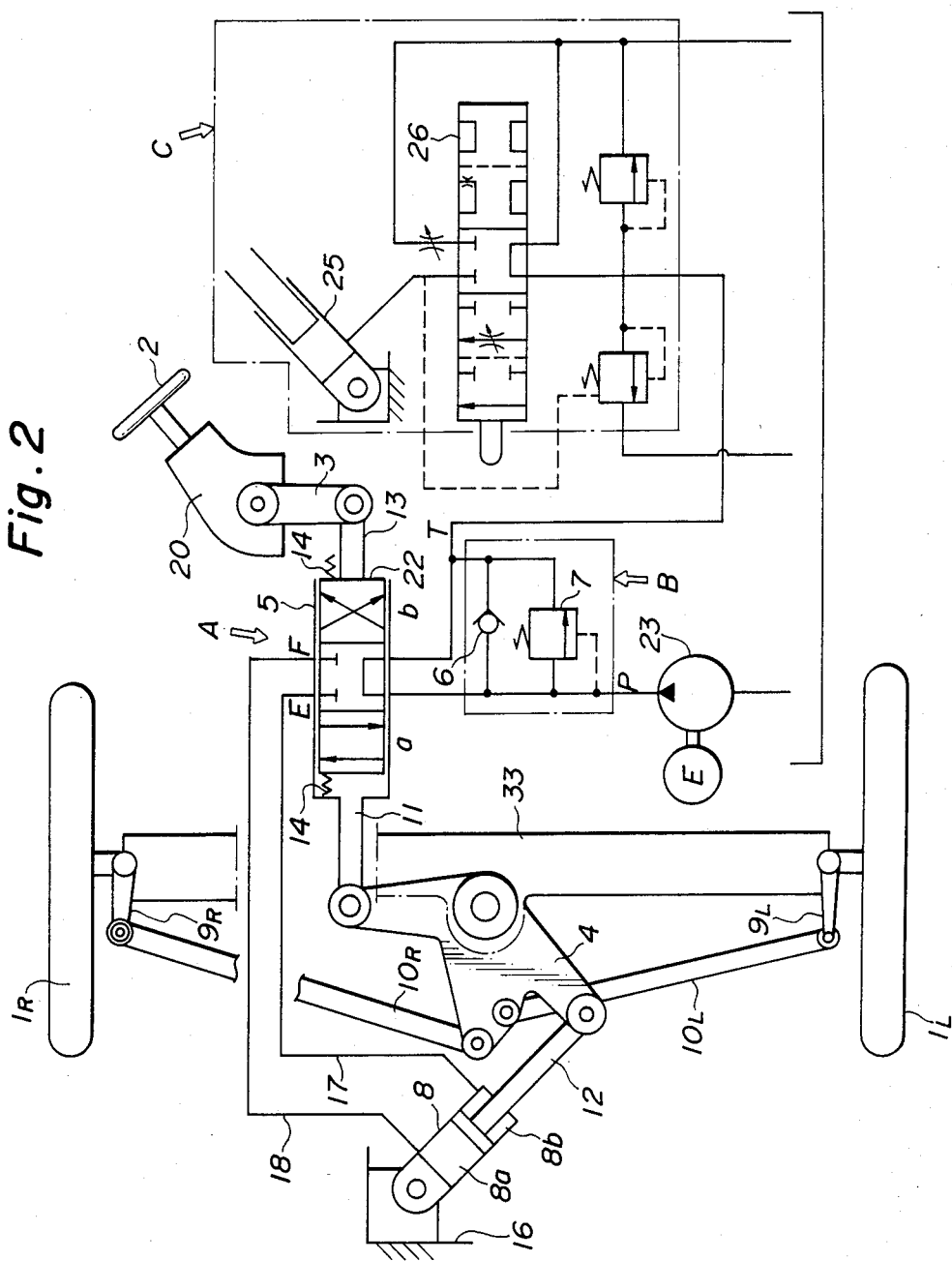
FIG. 2 is a diagram showing a hydraulic circuit embodying the invention.

With reference to FIG. 2 showing a hydraulic circuit, a hydraulic pump 23 is attached to one side of an engine E for driving the running wheels. The pump 23 withdraws a lubricant as a working fluid from a transmission case on the machine frame and discharges pressurizes the fluid, feeding the fluid to the hydraulic steering system and the hydraulic lifting system C. The working fluid from the hydraulic pump 23 is fed to the steering hydraulic valve means A of the hydraulic steering system via a check valve 6 and a relief valve 7. The working fluid forced out from the relief valve 7 is fed to the hydraulic lifting system C. The fluid passing through the steering hydraulic valve means A is also conjointly fed to the hydraulic lifting system C. Thus, the working fluid discharged from the the pump 23, after being used for the hydraulic steering system, is eventually totally fed to the lifting system C.

The check valve 6 is provided in order to prevent the interior of the steering hydraulic cylinder 8 from becoming a vacuum, which would hinder the operation of the steering wheel 2, when the speed at which the operator pushes or pulls drag rods 11 and 13 is greater than the speed of extension or contraction of the cylinder 8. When opened, the check valve 6 permits communication between the fluid chambers 8a and 8b of the hydraulic cylinder 8.

The check valve functions similarly in the case where the operator manually pushes or pulls the drag rods 11, 13, that is when the hydraulic pump 23 is out of operation. Stated more specifically, the working fluid within the cylinder 8 must be displaced to steer turn the front wheels 1L, 1R by rotating the steering wheel 2 with the engine E off check valve 6 is opened, to permit this displacement whereby the working fluid is made movable for the extension or contraction side of the steering valve means A.

The provision of the check valve 6 thus allows manual steering when no pressurized fluid is avaiable owing to a malfunction of the drive engine or hydraulic pump 23.

The steering hydraulic valve means A provided directly between the drag rods 11 and 13 also makes manual steering possible.

The steering hydraulic valve means A comprises a valve case 5 and a spool 22. The drag rods 11 and 13 are connected directly to valve case 5 and the spool 22 respectively. Accordingly, when the drag rod 13 is pushed or pulled by the rotation of the steering wheel 2 through a steering gear box 20 and the pitman arm 3, the spool 22 attached to the rod 13 is pushed or pulled, and the drag rod 11 attached to the valve case 5 is pushed or pulled.

When the steering wheel 2 is rotated to move the pitman arm 3 rightwardly in FIG. 2, to move the spool 22 against a spring 14 for biasing the spool to the neutral position, the port of the valve means A is shifted toward postion a, causing working fluid to flow into the chamber 8b of the steering hydraulic cylinder 8 via piping 17 and permitting the fluid in the chamber 8a to flow toward the hydraulic lifting system C.

Further when the pitman arm 3 is moved leftwardly in FIG. 2 the spool 22 moves, shifting the port of the valve means A toward b, working fluid enters the chamber 8a of the cylinder 8 via piping 18, causing the fluid in the chamber 8b to return to the hydraulic lifting system via the piping 17.

The bell crank arm 4 for operating knuckle arms 9L, 9R is pivoted to the piston rod 12 of the steering hydraulic cylinder 8 and to the drag rod 11 attached to the valve case 5; arm 4 operates knuckle arms 9L, 9R through tie rods 10L, 10R.

When the steering hydraulic cylinder 8 is extended by admission of working fluid to chamber 8a, the bell crank arm 4 rotates, pulling the tie rod 10R and pushing the tie rod 10R, whereby the knuckle arms 9L, 9R are turned to turn the front wheels 1L, 1R. Spool 22 will have been moved leftwardly to initiate this motion; the rotation of the bell crank arm 4 causes the drag rod 11 to move the valve case 5 in the same direction as the spool 22 had been moved and by the same amount, with the result that the spool 22 and the valve case 5 are returned to their original neutral position relative to each other. A steering operation is thus completed.

In this way, the displacement of the steering hydraulic cylinder 8 from its reference position is fed back to the steering hydraulic valve means A via the bell crank arm 4. The valve means A, which is interposed between the pitman arm 3 and the bell crank arm 4, thus serves also as a feedback link for returning the spool 22 to the neutral position. This arrangement serves to make the steering system concentrated and compact.

The bell crank arm 4 may also be arranged to serve directly as one of the knuckle arms.

When the steering valve means A is in the switch position a or b, working fluid is forced out from the chamber opposite to the chamber into which the fluid is admitted, to flow into the hydraulic lifting system C. When the steering hydraulic cylinder 8 has been extended or contracted to its full extent, the relief valve 7 is opened, from which the fluid is forced out into the lifting system C.

Figure 4:
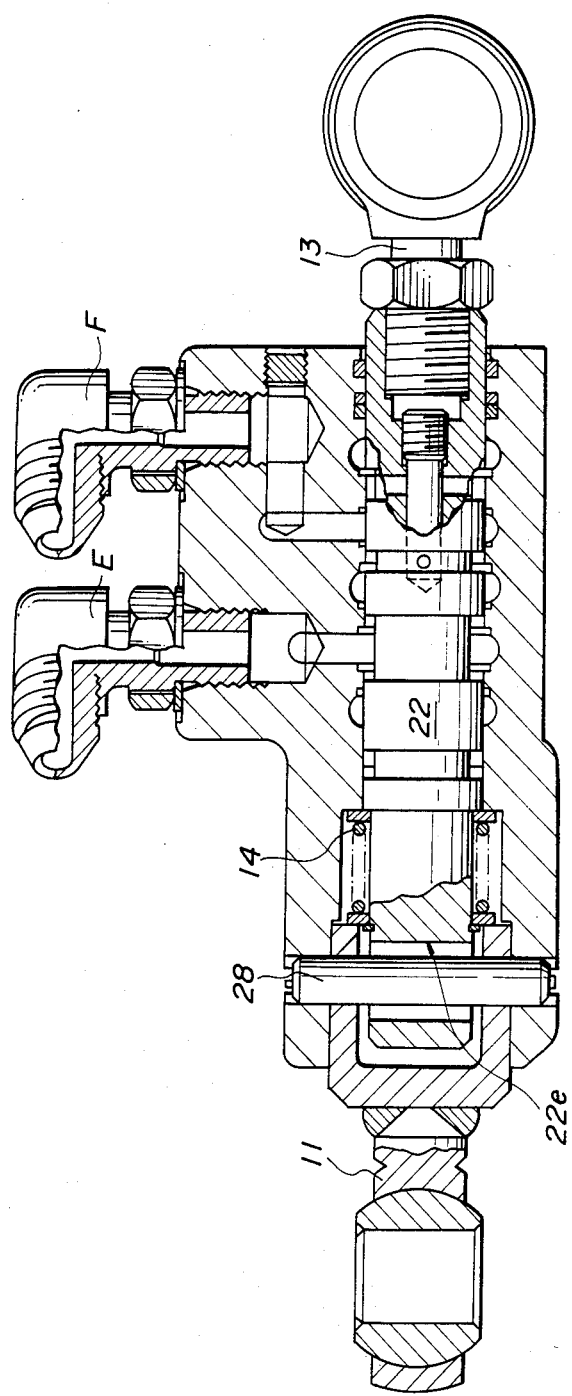
FIG. 4 is a view in section taken along the line N—N in FIG. 3.

With reference to FIG. 4, indicated at 28 is a pin for connecting the drag rod 11 to the valve case 5. The pin 28 is inserted also through a slot 22e in the spool 22 to prevent the spool from moving beyond its intended travel.

Figure 3:
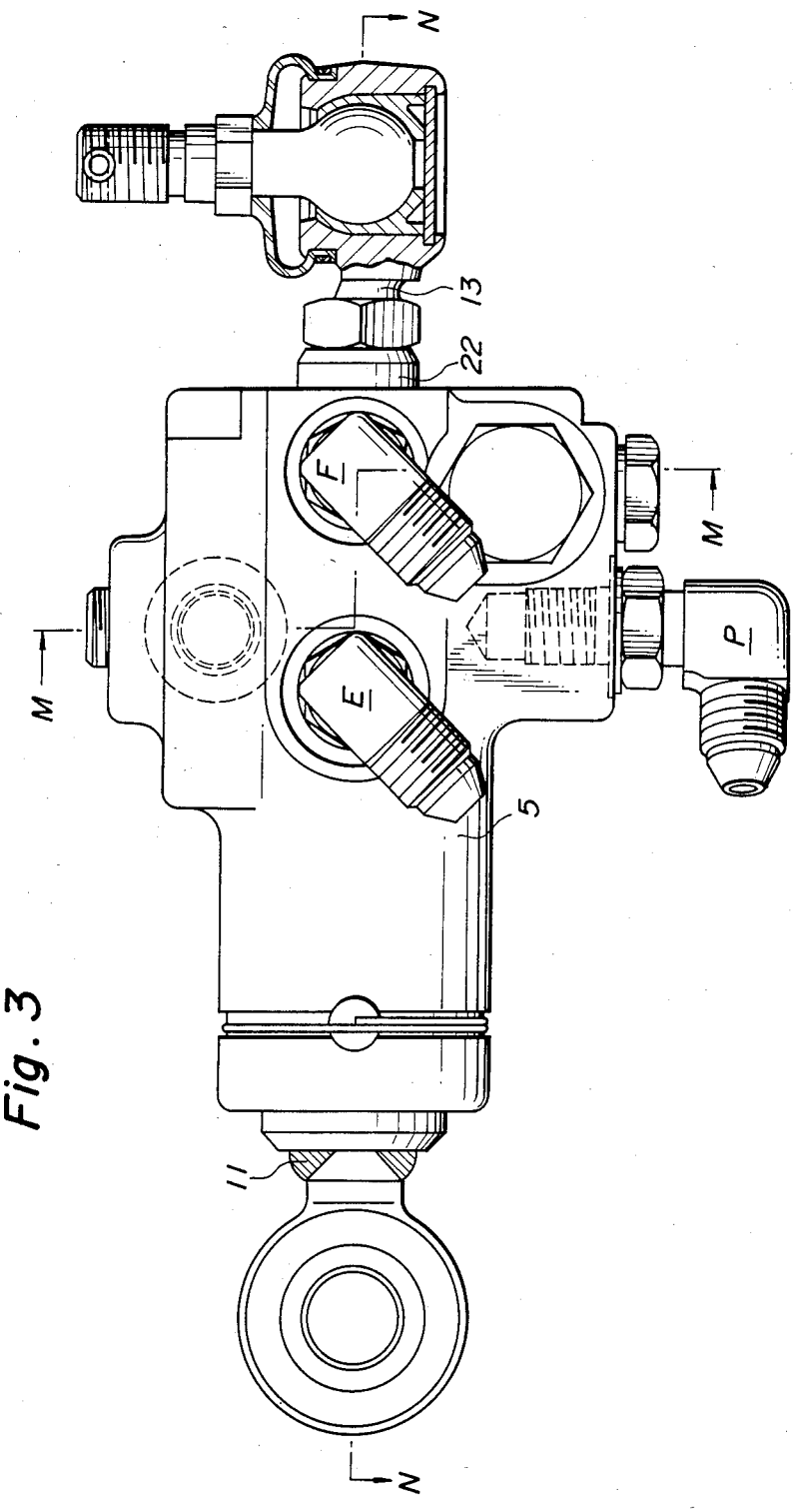
FIG. 3 is a plan view showing steering hydraulic valve means.
Figure 5:
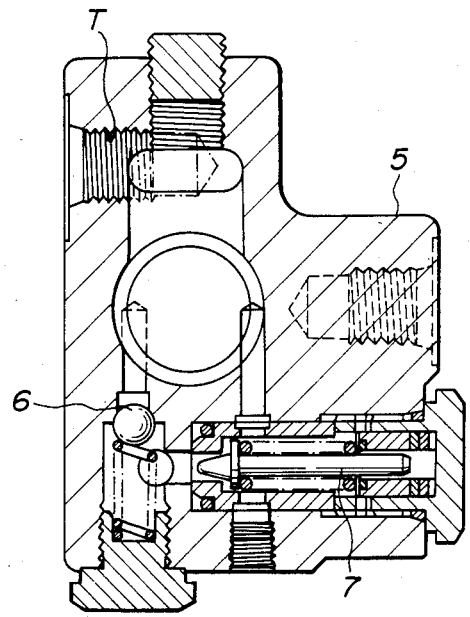
FIG. 5 is a view in section taken along the line M—M in FIG. 3.

FIGS. 3 and 5 show the manner in which the check valve 6 and the relief valve 7 are incorporated into the valve case 5 of the steering valve means A. This structure makes it possible to assemble these precision hydraulic parts as a unit which allows with the steering valve means A for ready modification of a four-wheel running vehicle for hydraulic steering according to the invention. One need merely provide the valve means A at the drag rod portion and interpose the steering hydraulic cylinder 8 between the machine frame 16 and the bell crank arm 4.

Figure 6:
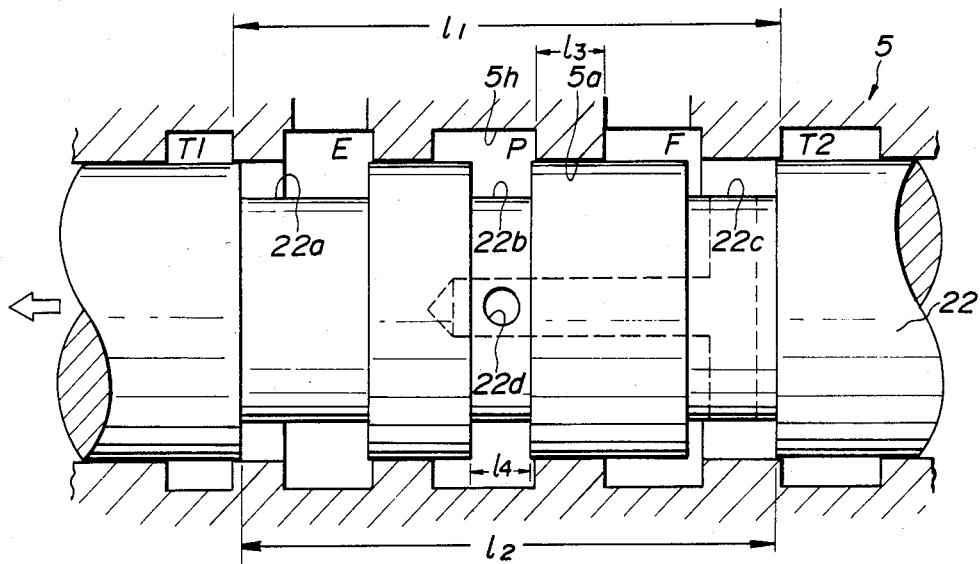
FIG. 6 is an enlarged sectional view showing the position of the spool of the valve means when the valve means is switched from its neutral position in a direction to extend a steering hydraulic cylinder.
Figure 7:
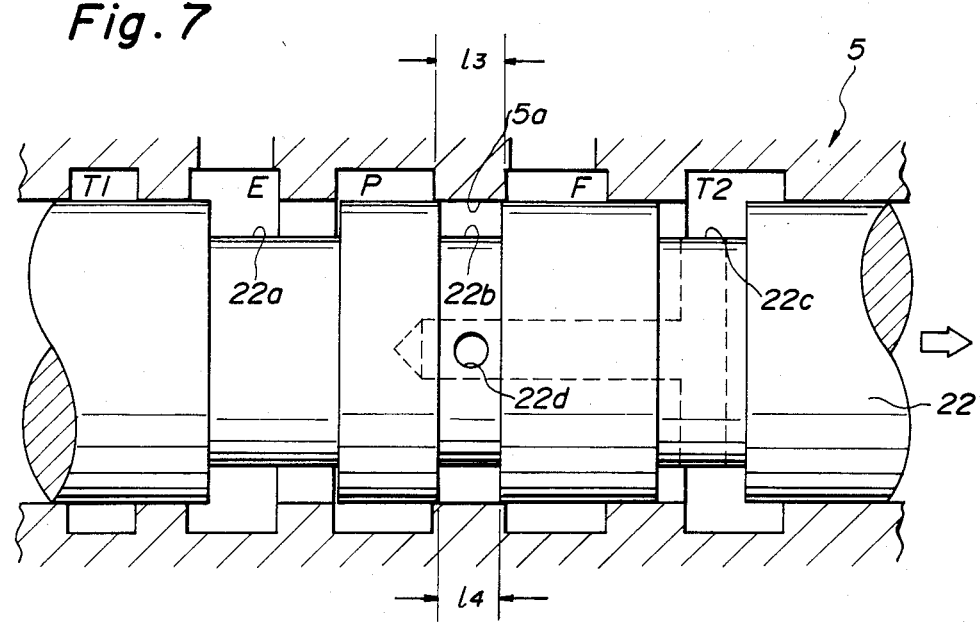
FIG. 7 is an enlarged sectional view showing the position of the spool when the valve means is switched from its neutral position in a direction to contract the steering hydraulic cylinder.
Figure 8:
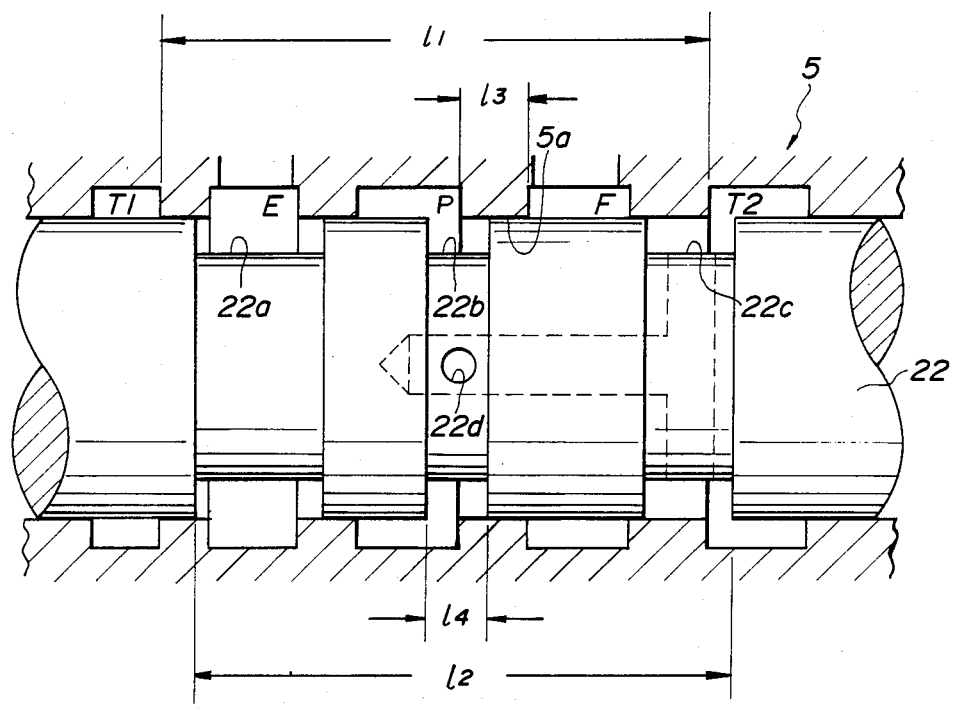
FIG. 8 is an enlarged sectional view showing the position of the spool when the valve means is in its neutral position.

FIG. 6 is an enlarged sectional view of a steering hydraulic valve means A of the tandem-center type to illustrate the position of the spool after having been moved from the neutral position so as to extend the steering hydraulic cylinder 8. FIG. 7 is a similar enlarged sectional view of the spool showing the position of the spool after movement from the neutral position so as to contract the hydraulic cylinder. FIG. 8 is an enlarged sectional view showing the spool in its neutral position.

The spool 22 is formed with paths 22a, 22b and 22c. The paths 22b and 22c are in communication with each other through a channel 22d. The valve case 5 has a land 5a, two tank ports T, i.e., T1 and T2, providing fluid channels to the hydraulic lifting system C, an E port communicating with the rod-side chamber 8b of the steering hydraulic cylinder 8, an F port communicating with the other chamber 8a thereof, and a pump port P.

When the valve means A is in its neutral position as seen in FIG. 8, the working fluid from the pump port P is led through the path 22b, communication channel 22d, path 22c into the tank port T2 and then fed to the hydraulic lifting system C.

When the spool 22 then slidingly moves leftward from the neutral position to the extension position as seen in FIG. 6, the fluid from the pump port P flows through the communication channel 22d and path 22c into the F port and then into the chamber 8a of the cylinder 8. If improperly designed, depending on the relation between the width of the path 22c and the position of the left end of the tank port T2, the tank port T2 at the right end can communicate with the F port, and the tank port T1 at the left end with the E port. Thus, there is the likelihood that both the E port and F port will simultaneously communicate with the tank ports. If the steering hydraulic cylinder 8 is of the single rod type, the cylinder 8 is then likely to extend in an undesired manner. This must be eliminated.

For this purpose, the distance l1 between the right end of the tank port T1 and the left end of the tank port T2 is made greater than the distance l2 between the left end of the path 22a and the right end of the path 22c according to the present invention. This prevents simultaneous connection of E and F through T1 and T2.

When the valve case 5 and the spool 22 are designed as above, there is invariably a moment when both the fluid channels of E→T and F→T are closed, and one of the channels is thereafter opened. Thus, a difference occurs in the opening timing between the two channels.

FIG. 7 shows the spool as slidingly moved rightward from the neutral position to contract the steering hydraulic cylinder 8. If improperly designed, depending on the relation between the width of the land 5a of the valve case 5 and the width of the path 22b in the spool 22 as opposed to the land, the F port and E port could communicate with the tank port T2 at the same time. More specifically, when the F port communicates with the tank port T2 via the path 22b, communication channel 22d and path 22c, the E port is likely to communicate with the tank port T2 via the path 22a, pump port P and path 22b simultaneously. To avoid this objection, the width l3 of the land 5a of the valve case is made greater than the width l4 of the path 22b in the spool 22.

Consequently, there is invariably a moment when both the fluid channels of F→T and E→T are closed to produce such a difference in timing, so that one channel is opened only after the other one of the channels has been closed.

Although the working fluid is confined in the valve means A at the moment when the two fluid channels are closed, no problem arises since the fluid forces the relief valve 7 open to flow through the tank port T into the hydraulic lifting system C.

Because of the above arrangement, the steering hydraulic valve means of the tandem-center type is made free of the trouble that could otherwise result from the dimensional relation between the spool and the valve case, i.e., that when the valve means is switched from the neutral position to the leftward or rightward turning position, the fluid channel for the hydraulic lifting system C will momentarily communicate with the steering hydraulic cylinder 8.

Figure 9:
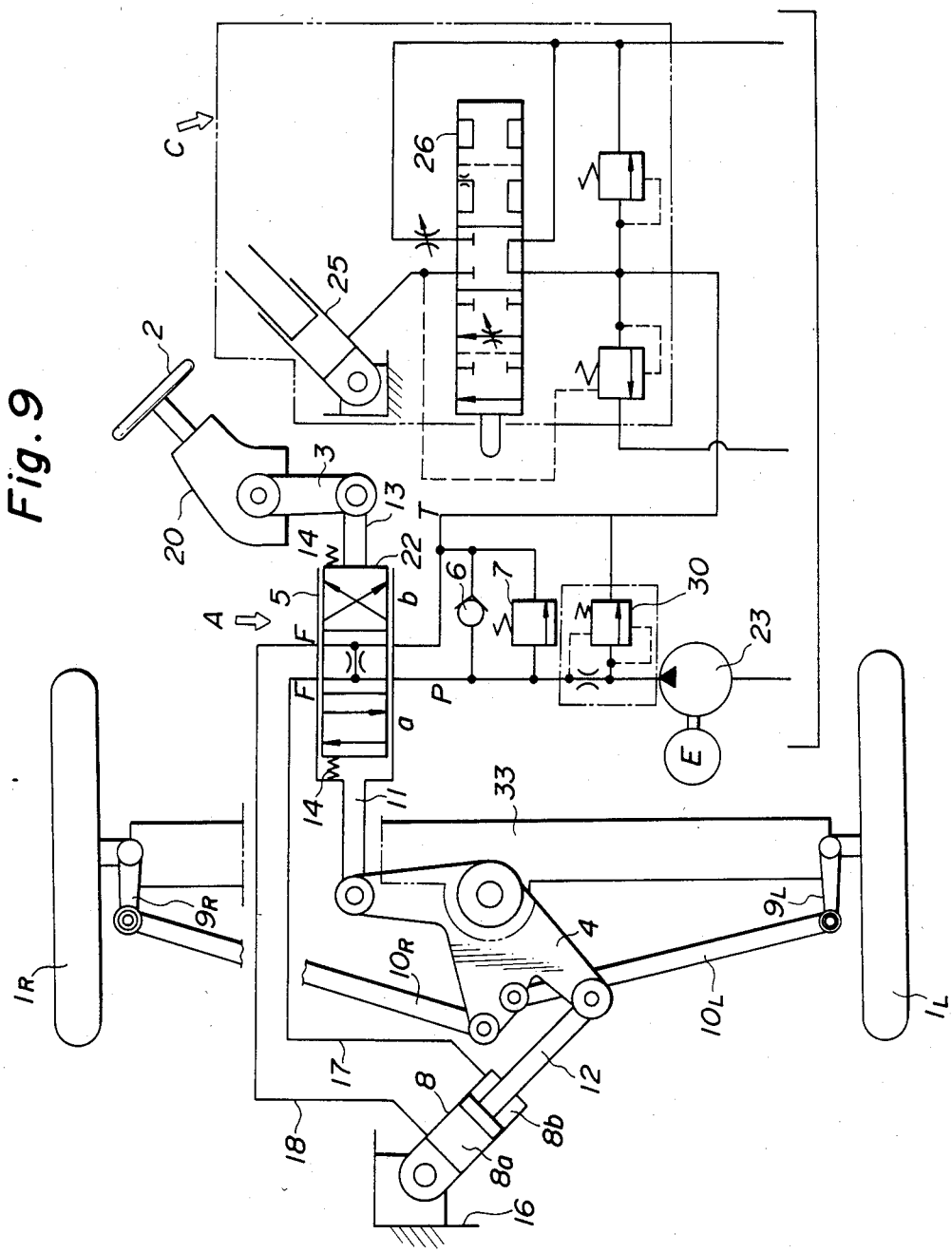
FIG. 9 is a diagram showing a hydraulic circuit embodying the invention and including steering hydraulic valve means of the open-center type when in neutral position and a flow control valve in parallel with a check valve and a relief valve.

FIG. 9 shows an embodiment of the invention in which steering hydraulic means A is of the open-center type. In the case of the foregoing valve means A of the tandem-center type, the steering hydraulic cylinder is free of the influence of pressure of the hydraulic lifting system C when the valve means is in its neutral position. However, upon movement of the valve A to steer the vehicle, the working fluid will rush into the steering cylinder 8, means A, causing excessive steering or producing a shock at the steering wheel. Further in order to prevent the tank port from communicating with both the E and F ports at the same time, the spool needs to have a non-operative portion, this casuse increased play in the steering gear.

In the case where the steering valve means A is of the open-center type to remedy these drawbacks, the E port and F port could communicate with the tank port T in the neutral position. Consequently, when the lifting hydraulic cylinder 25 is loaded by the hydraulic lifting system C for lifting the working implement, the pressure in piping 17, 18 builds up, which causes the steering hydraulic cylinder 8 of the single rod type to extend due to the difference in active piston area due to the presence of the piston rod 12 on only one side thereof.

To eliminate this drawback, i.e., to prevent the movement of the steering hydraulic cylinder 8 from being delivered to the operator's hands on the steering wheel 2 when the cylinder 8 extends owing to the pressure difference, the force of the spring 14 biasing the spool of the steering valve means A toward its neutral position is made greater than the force required for rotating the pitman arm 3 from the drag rod (13) side. When the cylinder 8 extends, it compresses the spring 14, which causes the steering valve means A to automatically return the steering hydraulic cylinder 8 to the original position.

With reference to FIG. 9, a flow control valve 30 is provided in parallel with the relief valve 7 and the check valve 6. The amount of working fluid supplied to the steering system during idling of the drive engine E greatly differs from the fluid supply thereto when the engine is driven at the highest speed, consequently giving a different feel to the hand of the operator on the steering wheel. The flow control valve 30 serves to maintain a constant amount of fluid supply to the hydraulic steering system eliminating this objection.

According to the present invention, the hydraulic pump 23 is used for feeding working fluid to the hydraulic steering system and to the hydraulic lifting system C disposed in series therewith. The steering hydraulic cylinder 8 is of the single rod type, and no flow divider is used. When the hydraulic lifting system C is loaded in this case, the resulting change of the lift pressure produces an exactly opposite changes in the output of the steering hydraulic cylinder 8, i.e., a gradual decrease at the rod side and a gradual increase at the other side.

Figure 10:
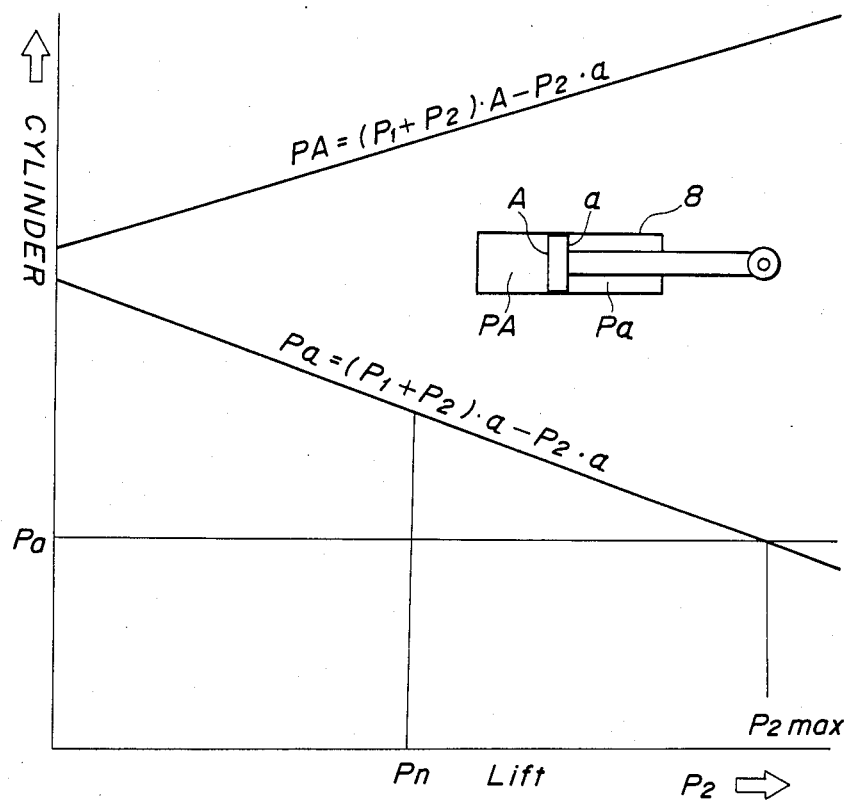
FIG. 10 is a graph showing the relation between the lift pressure of a working implement lifting hydraulic system and the output pressure of the steering hydraulic cylinder.

This is illustrated in FIG. 10, in which the symbols shown have the following meanings.

PA: the output of the steering hydraulic cylinder 8 when the working fluid is supplied to its cylinder side.
Pa: the output of the piston rod side of the cylinder.
P1: the relief pressure of the relief valve 7.
P2: the lift pressure produced in the hydraulic lifting system C for lifting the working implement, i.e., planting device D.
A: the pressure acting area of the piston 12 on one side thereof where the rod 12 is absent.
a: the pressure acting area of the piston 12 except for the cross section of the rod 12.

The output PA of the cylinder side is then given by:

$$PA = (P1 + P2) \cdot A - P2 \cdot a$$

The output Pa of the rod side is given by:

$$Pa = (P1 + P2) \cdot a - P2 \cdot A$$

In FIG. 10, the variation in the lift pressure P2 is plotted as abscissa. The outputs PA and Pa of the cylinder side are plotted on the ordinate. As shown, PA increases with an increase in the lift pressure P2, whereas the output Pa of the rod side gradually decreases with increasing lift pressure.

Thus, the output PA increases and therefore no problem arises, whereas the output Pa gradually decreases. Accordingly, a limit is set for the lift pressure P2 so that the output Pa will not be lower than a minimum Pm required for steering.

What is claimed is:

1. In a four-wheel running vehicle having hydraulic steering means and a hydraulic system C for lifting a working implement, a hydraulic steering system characterized in that the steering system comprises steering hydraulic valve means A having a first end connected to a housing and a second end connected to a spool moveable within said housing, said valve means A being connected so that a working fluid from a hydraulic pump 23 operable by a drive engine E is fed through the hydraulic valve means A to hydraulic valve means 26 of the hydraulic lifting system C in series with the valve means A, the steering hydraulic valve means A having one end connected to a pitman arm 3 and the other end connected to means for operating knuckle arms 9, a bypass being provided in parallel with the steering hydraulic valve means A having a relief valve 7, and a check valve 6 openable in response to a negative pressure in a steering hydraulic cylinder 8.

2. A hydraulic steering system as defined in claim 1 wherein the check valve 6 and the relief valve 7 are incorporated in the steering hydraulic valve means A.

3. A hydraulic steering system as defined in claim 1 wherein the steering hydraulic valve means A is of the tandem-center type when in its neutral position, and the steering hydraulic cylinder 8 is of the single piston rod type, wherein a fluid channel in the steering hydraulic valve means for the hydraulic lifting system C is prevented from communicating with fluid channels in the steering hydraulic valve means connected to opposite chambers of the steering hydraulic cylinder 8 simultaneously.

4. A hydraulic steering system as defined in claim 1 wherein the steering hydraulic valve means A is of the open-center type when in its neutral position, the steering hydraulic cylinder 8 is of the single piston rod type, and a spring 14 is provided and supplies a biasing force on the spool of the steering valve means A urging the spool toward its neutral position, said biasing force being greater than the force required for rotating the pitman arm 3 from the drag rod side, so that when the steering hydraulic valve means A is in its neutral position and when the steering hydraulic cylinder 8 is extended by a change of the hydraulic pressure of the lifting system C, the force of the extension is not delivered to a steering wheel 2 of the vehicle.

5. A hydraulic steering system as defined in claim 1 wherein a flow control valve 30 is disposed in parallel with the valve means A, the relief valve 7 and the check valve 6.

6. A hydraulic steering system as defined in claim 1 wherein the steering hydraulic cylinder 8 is of the single piston rod type, and the output Pa of the rod-side fluid chamber of the cylinder 8 is always positive relative to variations in the lift pressure P2 of the hydraulic lifting system C.

* * * * *